United States Patent [19]

Lemon

[11] 4,018,317
[45] Apr. 19, 1977

[54] SPIN PROOF TANDEM AXLE DRIVE MECHANISM

[75] Inventor: Robert William Lemon, Farmington, Mich.

[73] Assignee: Borg-Warner Corporation, Chicago, Ill.

[22] Filed: Aug. 7, 1975

[21] Appl. No.: 602,951

[52] U.S. Cl. .................................. 192/36; 180/44 R
[51] Int. Cl.² ....................................... F16D 13/04
[58] Field of Search ................. 192/35, 36; 74/665, 74/15.8; 180/44

[56] References Cited

UNITED STATES PATENTS

| | | | |
|---|---|---|---|
| 2,851,115 | 9/1958 | Buckendale | 74/665 GC |
| 3,194,369 | 7/1965 | Witte | 192/36 |
| 3,481,436 | 12/1969 | Wilkowski | 192/35 |
| 3,779,350 | 12/1973 | Rist | 192/35 |

*Primary Examiner*—Samuel Scott
*Assistant Examiner*—Wesley S. Ratliff, Jr.
*Attorney, Agent, or Firm*—Robert L. Zieg

[57] ABSTRACT

A torque transfer mechanism for transferring drive to a pair of tandem driving axles of a vehicle including a one-way driving device or roller clutch mounted in a housing, with an input shaft and concentric output shafts being mounted in said housing with the input shafts extending from one side of the one-way device and the concentric output shafts extending from the other side of the one-way device, each of said output shafts connected to drive one of said driving axles. The one-way device includes a drive race formed on the input shaft, the input shaft also being connected through the drive race to one of the output shafts, and the driven race being connected to the other output shaft with a plurality of wedging rollers mounted between the races. Torque is normally transferred to said one output shaft and the one-way device is responsive to relative rotation between the output shafts to provide drive to the other output shaft connected to the driven race when it is not rotating faster than the one output shaft.

13 Claims, 6 Drawing Figures

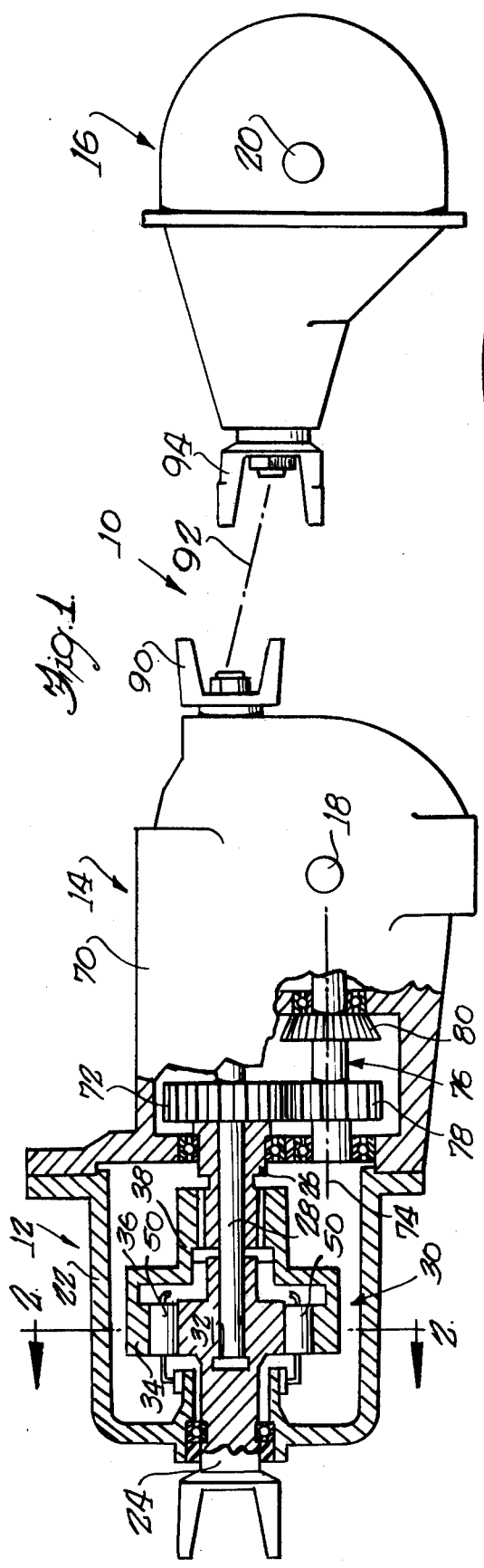
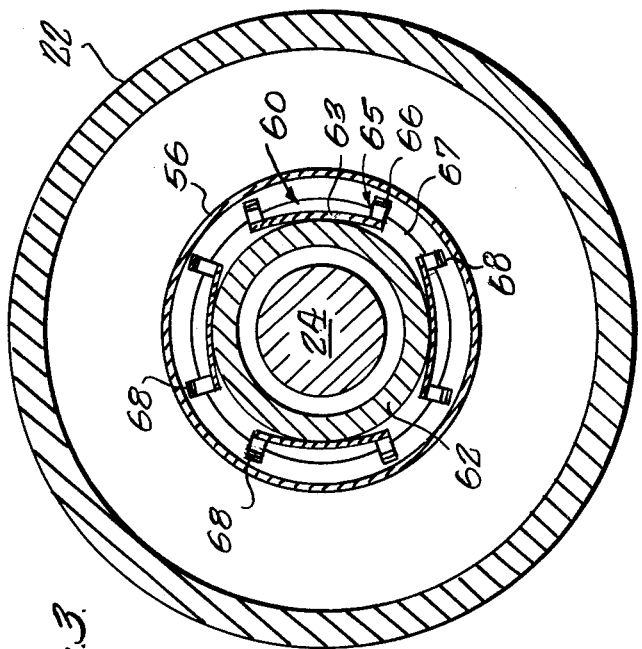
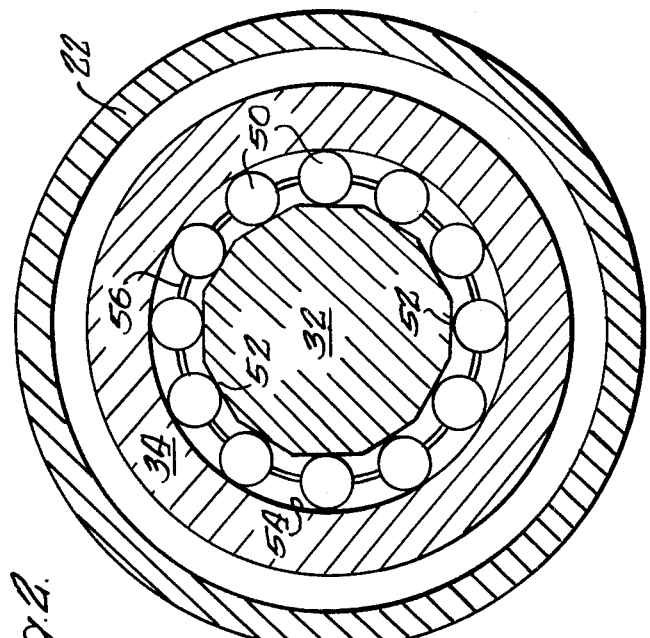

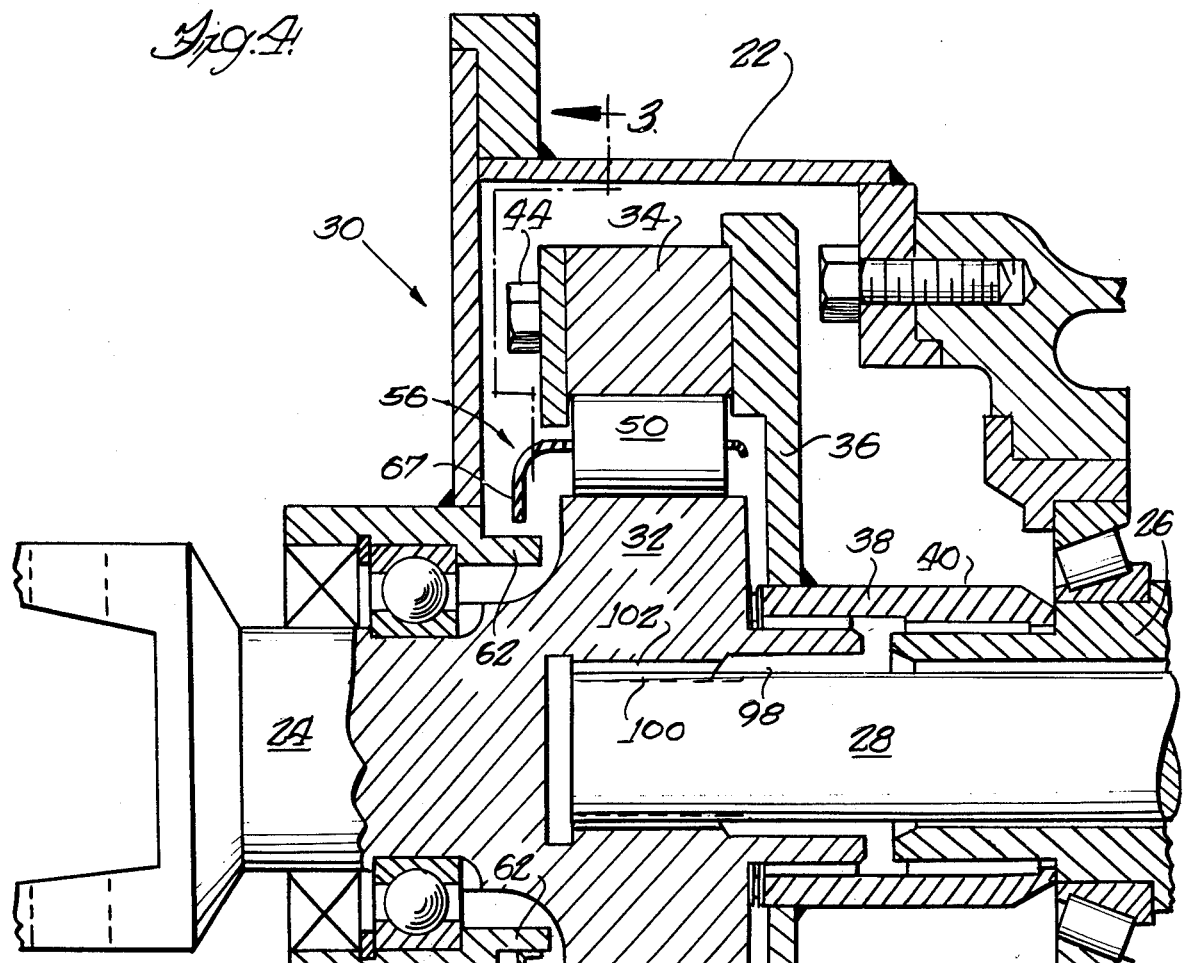
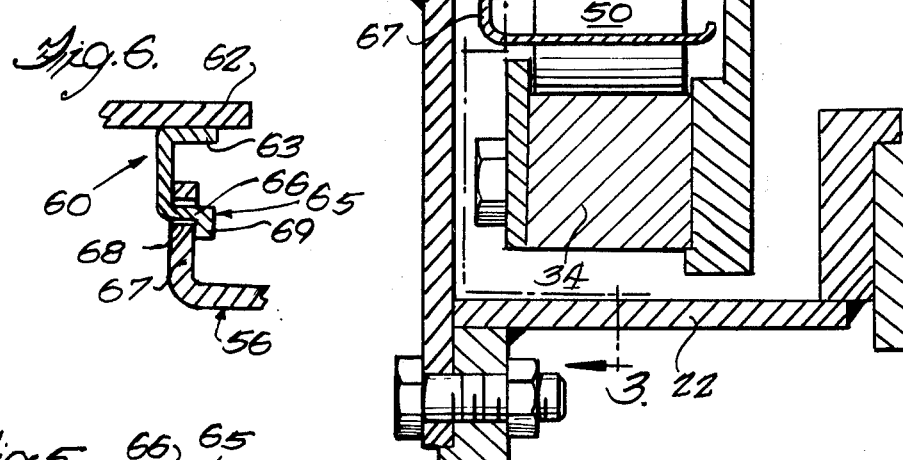
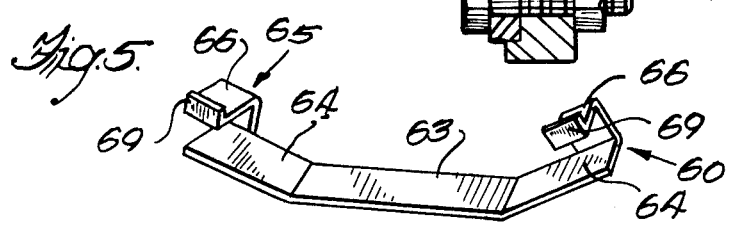

SPIN PROOF TANDEM AXLE DRIVE MECHANISM

BACKGROUND OF THE INVENTION

It has been known in the prior art to provide for utilization of roller clutch devices in torque transfer mechanisms for tandem driving axles. As presently known, a pair of roller clutch units are utilized in which a shifting mechanism is provided for selecting forward and reverse one-way devices to drive the tandem axles. Such double one-way devices are expensive and also in some cases necessitate the use of the shifting mechanism to select forward and reverse operation. In addition, other known mechanisms to transfer drive to a pair of driving axles utilize complex differential mechanisms such as standard bevel differential mechanisms such as standard bevel differentials which are also expensive. It has been found that when attempting to use a single one-way device of the double-acting type where only a single set of rollers and a pair of races are utilized, difficulties are encountered in having the device work in both directions of relative rotation, and also to provide means to insure the rollers will go into wedging engagement at the proper time.

SUMMARY OF THE INVENTION

The present invention provides a unique one-way mechanism utilizing a single double-acting roller clutch for transferring torque between a vehicle engine and two tandem driving axles. The drive of tandem axles is provided by an inner or drive race connected to directly drive one output shaft connected to a driving axle and the outer or driven race of the one-way device is connected to drive another output shaft, concentric to the one output shaft, connected to the other drive axle. Between the races, a plurality of rollers are mounted which are guided and supported by a roller cage. The roller cage is frictionally connected to the housing for the transmission mechanism whereby when the input shaft rotates the direct connection to one of the output shafts will drive its axle in the forward direction. Suitable gearing is provided in the connection to the other driving axle or the tires are properly sized, so that the other driving axle normally rotates faster whereby the driven race of the one-way device will rotate faster and due to its connection with the rollers tends to hold the rollers in a disengaged position. However, when the first driving axle begins to spin and thus approaches the speed of the normally overrunning axle, the rollers will tend to move to the locking position due to the frictional connection with the housing and lock up the unit to provide drive through the one-way device to the normally overrunning driven race and its driving axle. Thus the unique device of the present invention provides for direct torque transmission to one axle of a tandem driving axle under normal conditions and automatically provides for transfer of the torque to the other driving axle under conditions in which the first driving axle is slipping.

BRIEF DESCRIPTION OF THE DRAWINGS

The objects and advantages of this invention will become apparent to those skilled in the art upon consideration of the specification herein including the drawings, wherein:

FIG. 1 is a partial sectional view of a torque transfer mechanism for driving a pair of tandem driving vehicle axles;

FIG. 2 is a sectional view taken along the lines 2—2 to FIG. 1;

FIG. 3 is a sectional view taken along the lines 3—3 of FIG. 1;

FIG. 4 is an enlarged sectional view of the one-way device of FIG. 1;

FIG. 5 is a perspective view of the friction springs used in the device of FIG. 1; and FIG. 6 is an enlarged sectional view of the cage and drag spring arrangement illustrated in FIG. 5.

BRIEF DESCRIPTION OF THE PREFERRED EMBODIMENT

Referring to FIG. 1, there is illustrated an axle mechanism 10 which is of the type utilized in vehicles wherein two tandem parallel driving axles are to be driven. The axle mechanism 10 includes a torque transfer device 12, a first driving axle mechanism 14, and a second driving axle mechanism 16. Each of the driving axle mechanisms 14 and 16 includes a differential mechanism (not illustrated) to provide for drive to a pair of axle shafts to which are attached the vehicle's driving wheels. Axle mechanism 14, for example, drives axle shafts concentric with the axis 18, and axle mechanism 16 drives a differential mechanism which will drive axles mounted on an axis 20.

In general, the torque transfer mechanism 12 includes a housing 22. Mounted within the housing 22 is an input shaft 24 and a pair of concentric output shafts 26 and 28, the output shaft 28 being internal of the hollow output shaft 26. Provided between the input shaft 24 and output shaft 26 is the unique roller clutch or one-way device 30 of the present invention.

The roller clutch 30 includes an inner race element or drive race 32 formed on the input shaft 24 and an outer race element or driven race 34 which is connected by means of a radial flange 36 and driving sleeve 38 fixed thereon to the output shaft 26. Splines 40 are provided on the sleeve 38 which engage with splines 42 on output shaft 26 to provide the driving connection. The radial flange 36 is fixed to the drive sleeve 38, by welding, for example, and the driven race 34 is fixed to flange 36 by bolts 44.

A plurality of wedging elements or rollers 50 are provided between the inner drive and outer driven race elements 32 and 34 respectively. Referring to FIG. 2, it can be seen that race 32 has a plurality of cam surfaces 52 thereon which comprise a cam means for engagement with the rollers 50. The race 34 includes an inner smooth race surface 54 which is cylindrical in configuration and is adapted to be in operative engagement with wedging elements or rollers 50.

The rollers 50 are contained within a cage mechanism 56. The cage element 56 has a plurality of openings generally corresponding to the dimensions of the rollers 50 to contain and support the rollers 50 during operation of the device. Attached to the cage element 56 by a tab and slot arrangement are a plurality of drag springs 60 which are flexible and engage with a circular section 62 of housing 22. Drag springs 60 as illustrated in FIG. 5, are comprised of flat sheet metal having a flat center section 63 with bent end portions 64. The end portions 64 each have a tab means 65 thereon having extensions 66 thereon parallel to end portions 64. The flat center section 63 is adapted to engage housing section 62 to establish a frictional connection therewith.

Cage 56 has a radially inwardly extending flange 67 thereon in which are formed a series of equally spaced slots 68. Drag springs 60 are assembled to cage 56 by slightly flexing them and inserting extensions 66 in mating slots 68 as best illustrated in FIG. 6. The flexing of springs 60 provides a tension in the springs 60 when they are assembled to cage 56 holding the springs in the slots 68. Extensions 66 include at the terminal portion, a securing tab 69 which is bent upwardly with respect to extensions 66 to insure that the drag springs 60 will be retained within the slots 68 as best illustrated in FIGS. 5 and 6.

Referring to the driving axle 14, it will be seen that a housing 70 is provided which can be attached by any known means as, for example, bolts to housing 22. Contained within the housing 70 is the output shaft 26 which has formed thereon an output gear 72. On an offset parallel axis 74 is provided a propeller shaft 76 which has formed thereon a drive gear 78 which is in engagement with output gear 72. Also formed on propeller shaft 76 is a pinion gear 80 which is adapted to mesh with and drive a ring gear and a differential (not illustrated) in a conventional manner to provide drive to the output axles of the mechanism 14.

Concentric with output shaft 26, output shaft 28 extends therethrough to drive an output means 90 which by means of a propeller shaft 92 (shown only in schematic form) will drive the input means 94 of driving axle mechanism 16. The drive connection between input means 94 and the output axles on the axis 20 of driving axle 16 is of standard configuration involving a differential mechanism (not illustrated).

The output shaft 28 as viewed in FIG. 4 has external splines 100 thereon. Input shaft 24 has a bore 98 therein including internal splines 102 provided also within drive race 32 formed thereon. Splines 100 and 102 are in mesh to provide a driving connection between input shaft 24 and output shaft 28 and further to provide support for the end of output shaft 28.

The operation of the unique inter-axle drive mechanism illustrated in FIGS. 1 through 6 is as follows. The driving axle mechanism 14 is made such as to normally provide for rotation of the driven race 34 at a slightly higher speed than the rotation of drive race 32 and output shaft 28. This higher rotational speed can be induced by means of the ratio used between gears 72 and 78 or by means of the use of slightly smaller diameter tires driven by axle mechanism 14. When the engine drives input shaft 24, drive race 32 will be rotated and through splines 100-102 will drive output shaft 28 and thereby the rear axle mechanism 16 to drive the vehicle forward. The cage mechanism 56 having a frictional contact provided by the drag springs 60 with the housing 22 will tend to urge the rollers 50 into wedging engagement between races 32 and 34 due to the operation of the cam means 52. However, since driven race 34 is rotating at a slightly higher speed in the forward direction, the frictional contact between driven race 34 and rollers 50 tends to roll rollers 50 out of wedging engagement and allows race 34 to overrun race 32. Thus, the driving torque from input shaft 24 will primarily be conducted to inner race 32 and output shaft 28 to drive the axle mechanism 16 under normal conditions. These normal conditions exist so long as the driven race 34 and output shaft 26 are rotating slightly faster than input shaft 24 and output shaft 28.

In a condition where the driving axle 16 would slip as, for example, on ice or a slippery road, the output shaft 28 and drive race 32 will then speed up. When the speed of drive race 32 is equal to that of race 34, the rollers 50 will be moved from their released position and will be wedged into engagement between races 32 and 34 by cam means 52 to provide for torque transfer to driven race 34 and thus to provide driving torque to the axle mechanism 14. So long as the driven race 34 is going the same speed or tending to go slower than race 32, torque will flow to drive driving axle 14. However, when the driving axle 16 stops slipping and slows down such that output shaft 28 rotates slower than race 34 and output shaft 26, the torque drive will again be provided to the driving axle 16, and output shaft 26 and race 34 will again overrun slightly the race 32 to hold the rollers 50 in a released or non-wedging condition.

It should be noted that due to the construction of the device 30, the operation will be identical in reverse drive ratio as described above for forward operation.

From the above, it will be apparent that a unique mechanism has been provided for driving tandem driving axles wherein a unique one-way driving device is provided to drive a pair of concentric output shafts extending from a common side of the one-way driving device. The unique device of the present invention in a very simple manner provides for direct torque drive of the rear axle of the tandem driving axles of the vehicle and automatically provides for transfer of the drive to the front driving axle under conditions in which the rear driving axle slips or spins.

What is claimed is:

1. A torque transfer mechanism including an one-way device, said mechanism having an input shaft and a pair of concentric output shafts, said input shaft extending from one side of said device and said output shafts extending from the other side of said device, said output shafts connected to a pair of tandem parallel driving axles for a vehicle, said one-way device including a drive race connected to the input shaft and to one of said output shafts, a driven race connected to the other output shaft, a plurality of wedging elements mounted between said races, whereby torque is normally transmitted to said one output shaft, and said one-way device being responsive to relative rotation between said output shafts to provide for drive to said other output shaft when said one output shaft is rotating faster than said other output shaft.

2. A torque transfer mechanism as claimed in claim 1, wherein drive means are provided to transfer a drive from one of said concentric output shafts to a parallel driving propeller shaft.

3. The invention of claim 2, wherein said mechanism is mounted in a housing and said one-way device is double-acting, a cage supporting said wedging means and in frictional engagement with said housing, said wedging means being movable between engaging and disengaging positions, said frictional engagement of said cage with said housing tending relatively to bias said wedging element toward said engaging position, overrunning of said other output shaft with respect to said one output shaft tending relatively to bias said wedging elements toward said disengaging position.

4. The invention of claim 3, wherein said cage is a roller cage, and said wedging elements are rollers supported between said races by said roller cage.

5. The invention of claim 1, wherein said input has said drive race formed thereon, said drive race having a bore therein, said one output shaft extending into said bore and means in said bore connecting said input shaft to said one output shaft.

6. In a multiple drive axle vehicle having a torque transmission device for transferring torque from a source of power to a pair of tandem parallel drive axles; the combination wherein the torque transmission device includes a housing, an input shaft supported by said housing, first and second concentric output shafts supported by said housing, and means in said housing for transferring torque from said input shaft to said output shafts, said input shaft extending from one side of said means and said output shafts extending from the other side of said means, said means connecting said input shaft with one of said output shafts and including a double-acting roller clutch in said housing connecting said input with said other output shaft, said clutch including a drive race rotatable with said one output shaft, a cage in frictional engagement with said housing, and a plurality of wedging elements carried by said cage between said races and movable between clutch engaging and disengaging positions, said frictional engagement of said cage with said housing developing a first force tending relatively to move said wedging elements toward said engaging position, rotation of said other output shaft faster than said one output shaft developing a second force tending relatively to overcome said first force and move said wedging means toward said disengaging position.

7. The invention of claim 6, wherein said other output shaft is connected to a hollow drive sleeve, said drive sleeve being connected by a radial flange to said second race.

8. The invention of claim 7, wherein said other output shaft has an output gear formed thereon, an offset parallel propeller shaft with a drive gear thereon in mesh with said output gear to provide drive from said other output shaft to said offset propeller shaft.

9. The invention of claim 6, wherein said wedging means comprise rollers.

10. The invention of claim 9, wherein said first race comprises an external cam member having a plurality of cam surfaces thereon.

11. The invention of claim 10, wherein said second race includes an internal cylindrical surface.

12. In a one-way device adapted to provide a drive between an input shaft and an output shaft, a plurality of wedging means, a cage for said wedging means, a housing for said device, friction means connected to said cage and engaging said housing, said cage having a radially extending flange, said friction means comprised of a plurality of relatively flat springs, said cage flange having a plurality of slots, said springs having tabs thereon engageable within said slots, whereby said springs may be flexed and secured to said flange by engaging said tabs in said slots.

13. A device as claimed in claim 12, wherein said springs have a central flat section for engagement with said housing and said tabs are formed on either end of said flat section.

* * * * *